(12) United States Patent
Yamano

(10) Patent No.: US 12,205,502 B2
(45) Date of Patent: Jan. 21, 2025

(54) INFORMATION PROCESSING APPARATUS AND INFORMATION PROCESSING METHOD

(71) Applicant: SONY GROUP CORPORATION, Tokyo (JP)

(72) Inventor: Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 201 days.

(21) Appl. No.: 17/906,228

(22) PCT Filed: Mar. 19, 2021

(86) PCT No.: PCT/JP2021/011390
§ 371 (c)(1),
(2) Date: Sep. 13, 2022

(87) PCT Pub. No.: WO2021/200270
PCT Pub. Date: Oct. 7, 2021

(65) Prior Publication Data
US 2023/0118559 A1  Apr. 20, 2023

(30) Foreign Application Priority Data
Mar. 31, 2020 (JP) .................... 2020-064521

(51) Int. Cl.
*G09G 3/00* (2006.01)
*G06F 3/01* (2006.01)

(52) U.S. Cl.
CPC ............. *G09G 3/003* (2013.01); *G06F 3/013* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

2014/0285404 A1\* 9/2014 Takano ............... G06F 3/04812
345/8
2020/0066237 A1 2/2020 Wang et al.

FOREIGN PATENT DOCUMENTS

JP 2013-207682 A 10/2013
JP 2015-087921 A 5/2015
(Continued)

OTHER PUBLICATIONS

International Search Report and Written Opinion of PCT Application No. PCT/JP2021/011390, issued on Jun. 8, 2021, 11 pages of ISRWO.

*Primary Examiner* — Yi Wang
(74) *Attorney, Agent, or Firm* — CHIP LAW GROUP

(57) ABSTRACT

An information processing apparatus (10) is an information processing apparatus causing a user of a head mounted display to perceive a depth position of a virtual object by controlling display positions of a right-eye image and a left-eye image related to the virtual object, the information processing apparatus including: a determination unit (143) that determines an opened/closed state of an eye of the user on the basis of a detection result of a sensor (11) that detects a visual recognition state of both eyes of the user; a calculation unit (141) that calculates a display position in a depth direction of the virtual object; and a display control unit (145) that, in a case where it is determined that the display position in the depth direction is within a first distance indicating a predetermined short distance and both eyes of the user are opened, reduces visibility of the right-eye image and the left-eye image related to the virtual object, and in a case where it is determined that the display position in the depth direction is within the first distance and only one eye of the user is opened, increases the visibility reduced at least with respect to display of the one eye.

20 Claims, 13 Drawing Sheets

(56) References Cited

FOREIGN PATENT DOCUMENTS

| JP | 2017-058853 A | 3/2017 |
| WO | 2012/020558 A1 | 2/2012 |
| WO | 2017/022303 A1 | 2/2017 |
| WO | 2017/191703 A1 | 11/2017 |
| WO | 2019/150880 A1 | 8/2019 |

* cited by examiner

FIG.5
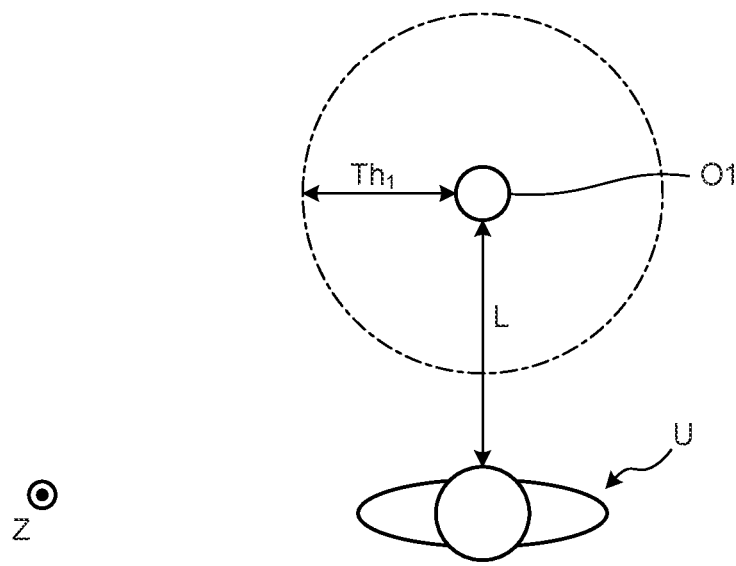
$L > Th_1$
| OPENED/CLOSED STATE | | RIGHT-EYE IMAGE | LEFT-EYE IMAGE |
|---|---|---|---|
| RIGHT EYE | LEFT EYE | | |
| - | - | ○ | ○ |
$L \leq Th_1$
| OPENED/CLOSED STATE | | RIGHT-EYE IMAGE | LEFT-EYE IMAGE |
|---|---|---|---|
| RIGHT EYE | LEFT EYE | | |
| 👁 | 👁 | × | × |
| 👁 | ︵ | ○ | × |
| ︵ | 👁 | × | ○ |

FIG.10
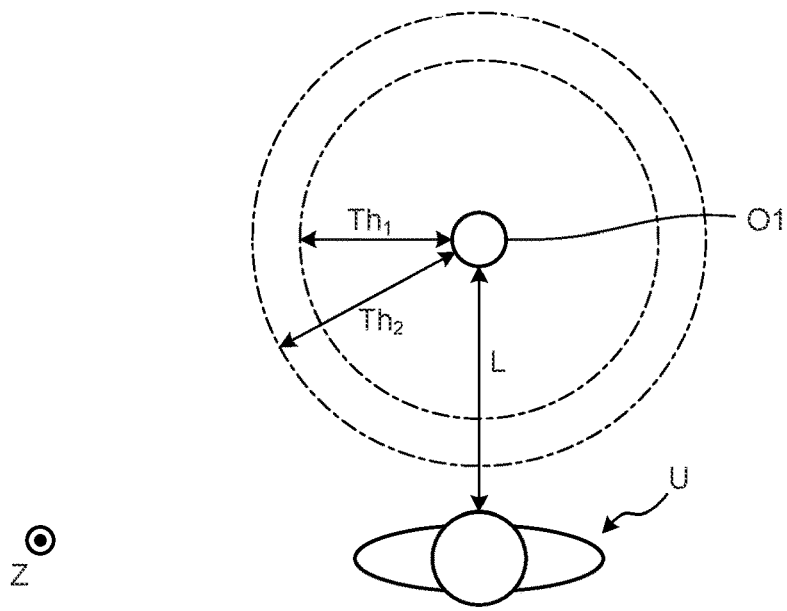
| L > Th$_2$ |
|---|
| OPENED/CLOSED STATE || RIGHT-EYE IMAGE | LEFT-EYE IMAGE |
| RIGHT EYE | LEFT EYE | | |
|---|---|---|---|
| - | - | ○ | ○ |
| Th$_2$ ≥ L > Th$_1$ |
|---|
| OPENED/CLOSED STATE || RIGHT-EYE IMAGE | LEFT-EYE IMAGE |
| RIGHT EYE | LEFT EYE | | |
|---|---|---|---|
| - | - | TRANSPARENT DISPLAY (TRANSPARENCY α = (L - Th$_1$) / (Th$_2$ - Th$_1$) * 0.5 + 0.5) ||
| L ≤ Th$_1$ |
|---|
| OPENED/CLOSED STATE || RIGHT-EYE IMAGE | LEFT-EYE IMAGE |
| RIGHT EYE | LEFT EYE | | |
|---|---|---|---|
| 👁 open | 👁 open | × | × |
| 👁 open | ︵ closed | ○ | × |
| ︵ closed | 👁 open | × | ○ |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/011390 filed on Mar. 19, 2021, which claims priority benefit of Japanese Patent Application No. JP 2020-064521 filed in the Japan Patent Office on Mar. 31, 2020. Each of the above-referenced applications is hereby incorporated herein by reference in its entirety.

FIELD

The present disclosure relates to an information processing apparatus and an information processing method.

BACKGROUND

In recent years, information processing apparatuses that display a virtual object on a display in front of the eyes of a user, such as AR glasses for augmented reality (AR) experience and a head mounted display (HMD) for virtual reality (VR) experience, are becoming widespread. Note that the AR glasses can also be said to be eyeglass-type HMDs.

In these information processing apparatuses, generally, a video is displayed at an optically fixed distance, and stereoscopic vision is implemented by adjusting the vergence distance according to a difference between right and left videos.

Note that, in a case where it is attempted to display a virtual object within a short distance (for example, 30 cm) close to the user's eye, it is known that there is a risk called a "vergence-accommodation conflict problem" that the focal length of the eye to an optical display surface and the vergence distance of binocular vision deviate from each other, thereby promoting user's sense of displeasure and causing symptoms such as sickness.

For this reason, in the currently commercially available AR glasses and HMDs, in a case where the user approaches the virtual object at a predetermined short distance, for example, the vergence-accommodation conflict problem is avoided by performing processing of hiding data within the short distance.

On the other hand, there are many situations where it is desired to display a three-dimensional (3D) model of a design object displayed in full size within a very short distance and to observe the design object in detail, for example, in a scene of industrial product design support. Thus, in order to respond to such a situation, a technology or the like has been proposed in which when a virtual object is displayed within a predetermined short distance, a video is displayed only on one eye side.

CITATION LIST

Patent Literature

Patent Literature 1: WO 2019/150880 A

SUMMARY

Technical Problem

However, the above-described conventional technology has room for further improvement in terms of reducing the burden on the user. For example, displaying a video only on one eye side in AR glasses or the like on the premise of binocular display causes a problem such as flickering of the visual field for the user.

In particular, in the case of performing superimposition display of a virtual object on a real object, it is a burden for the user to simultaneously perform the visual observation of the real object with both eyes and the visual observation of the virtual object with only one eye by the display on only one eye side.

Furthermore, for example, in the case of gradually approaching the virtual object, the display is unexpectedly switched to only one eye side, which also becomes a burden for the user.

Thus, the present disclosure proposes an information processing apparatus and an information processing method capable of displaying a virtual object within a short distance while reducing a burden on a user.

Solution to Problem

In order to solve the above problems, one aspect of an information processing apparatus according to the present disclosure is an information processing apparatus causing a user of a head mounted display to perceive a depth position of a virtual object by controlling display positions of a right-eye image and a left-eye image related to the virtual object, the information processing apparatus including: a determination unit that determines an opened/closed state of an eye of the user on the basis of a detection result of a sensor that detects a visual recognition state of both eyes of the user; a calculation unit that calculates a display position in a depth direction of the virtual object; and a display control unit that, in a case where it is determined that the display position in the depth direction is within a first distance indicating a predetermined short distance and both eyes of the user are opened, reduces visibility of the right-eye image and the left-eye image related to the virtual object, and in a case where it is determined that the display position in the depth direction is within the first distance and only one eye of the user is opened, increases the visibility reduced at least with respect to display of the one eye.

BRIEF DESCRIPTION OF DRAWINGS

FIG. 5 is a diagram illustrating an outline of an information processing method according to the embodiment of the present disclosure.

FIG. 10 is an explanatory diagram of an information processing method according to a first modification.

DESCRIPTION OF EMBODIMENTS

Figure 1:
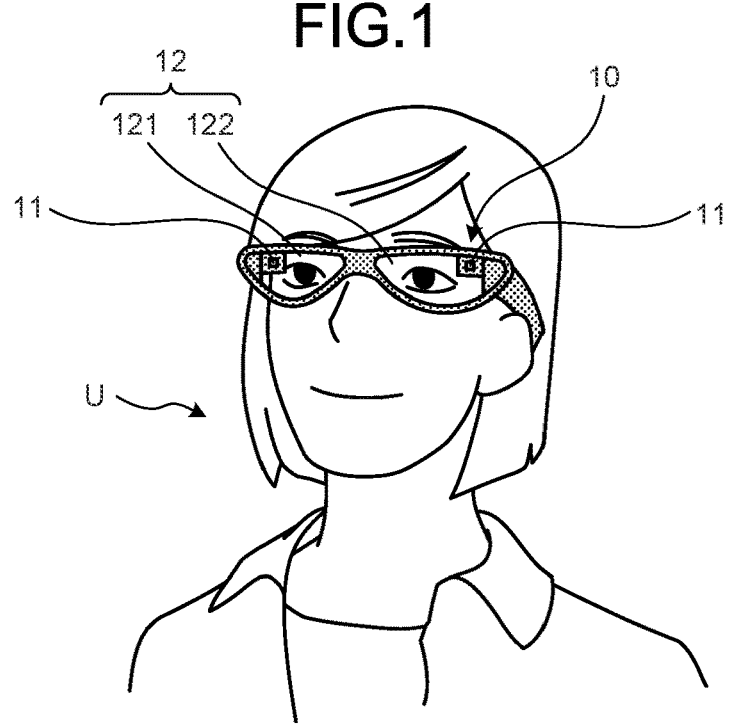
FIG. 1 is a diagram illustrating an example of a schematic configuration of an information processing apparatus according to an embodiment of the present disclosure.

The embodiment of the present disclosure will be described below in detail on the basis of the drawings. Note that, in each embodiment described below, the same parts are designated by the same reference numerals, and duplicate description will be omitted.

Furthermore, the present disclosure will be described according to the item order described below.

1. Overview
   1-1. Example of schematic configuration of information processing system
   1-2. Background
   1-3. Outline of the present embodiment
2. Configuration of information processing apparatus
3. Processing procedure of information processing apparatus
4. Modifications
   4-1. First modification
   4-2. Second modification
   4-3. Other modifications
5. Hardware configuration
6. Conclusion

1. OVERVIEW 1-1. Example of Schematic Configuration of Information Processing Apparatus FIG. 1 is a diagram illustrating an example of a schematic configuration of an information processing apparatus 10 according to an embodiment of the present disclosure. As illustrated in FIG. 1, the information processing apparatus 10 according to the embodiment of the present disclosure is implemented by, for example, AR glasses which are an eyeglass-type HMD worn on the head of a user U. The information processing apparatus 10 includes a sensor 11 and a display unit 12.

The sensor 11 is a sensor that senses various environmental information regarding the environment surrounding the user U, various state information regarding the state of the user U, and the like. In the example of FIG. 1, a stereo configuration having two sensors 11 is illustrated, but the number of sensors 11 is not limited.

For example, the sensor 11 has a function as a recognition camera for recognizing the space in front of the eye of the user U. Furthermore, for example, the sensor 11 has a function as a sensor that senses the blocked state of the field of view of the user U. The blocked state of the field of view of the user U includes an opened/closed state of both eyes of the user U, presence or absence of an object that blocks the field of view of the user U, and the like. Details of such a point will be described below in a specific description of a configuration example of the information processing apparatus 10.

The display unit 12 corresponds to a spectacle lens portion positioned in front of the eyes of the user U when worn, and has optical transparency. The display unit 12 includes a right-eye display 121 that displays a right-eye image and a left-eye display 122 that displays a left-eye image.

When the information processing apparatus 10 is worn by the user U, as illustrated in FIG. 1, the right-eye display 121 is located in front of the right eye of the user U, and the left-eye display 122 is located in front of the left eye of the user U. Note that the display unit 12 is not necessarily divided into the right-eye display 121 and the left-eye display 122, and the right-eye image may be displayed on the right side of an integrally formed display and the left-eye image may be displayed on the left side of the display. The information processing apparatus 10 enables stereoscopic vision of a virtual object in front of the line of sight of the user U by displaying the right-eye image and the left-eye image on the display unit 12.

Note that the shape of the information processing apparatus 10 is not limited to the example illustrated in FIG. 1. For example, the information processing apparatus 10 may be a headband type HMD using a band going around the entire circumference of the temporal region or a band passing through the top of the head, a helmet type HMD in which the visor portion corresponds to the display, or the like.

1-2. Background

Figure 2:
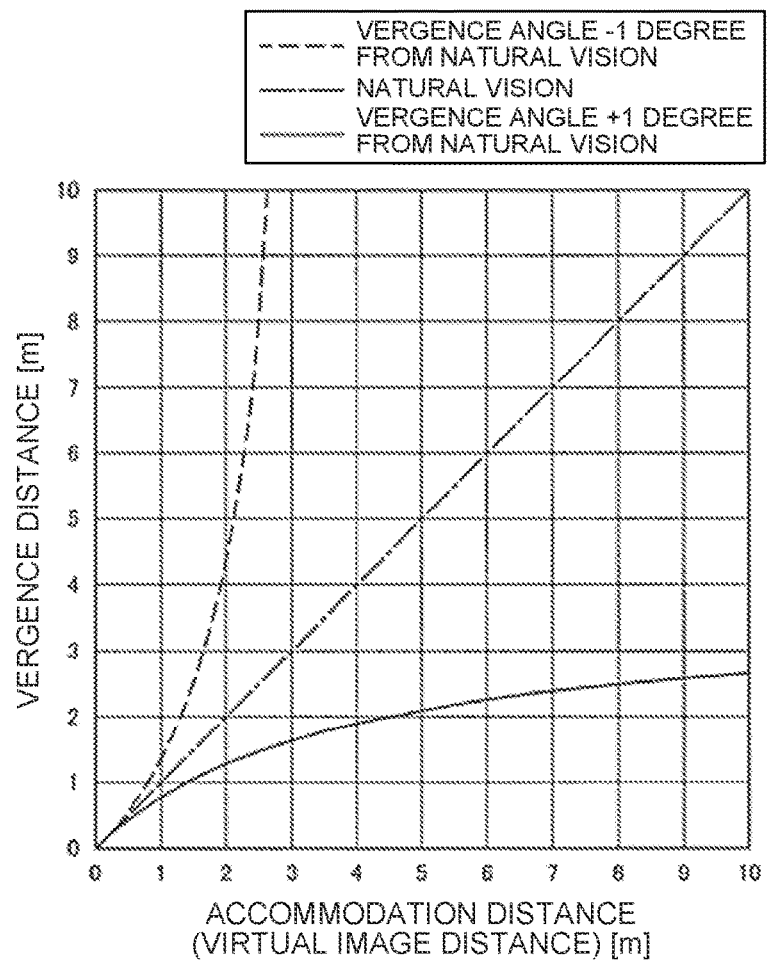
FIG. 2 is a diagram illustrating a relationship between an accommodation distance and a vergence distance in a range of a deviation amount recommended in ISO 9241-392.
Figure 3:
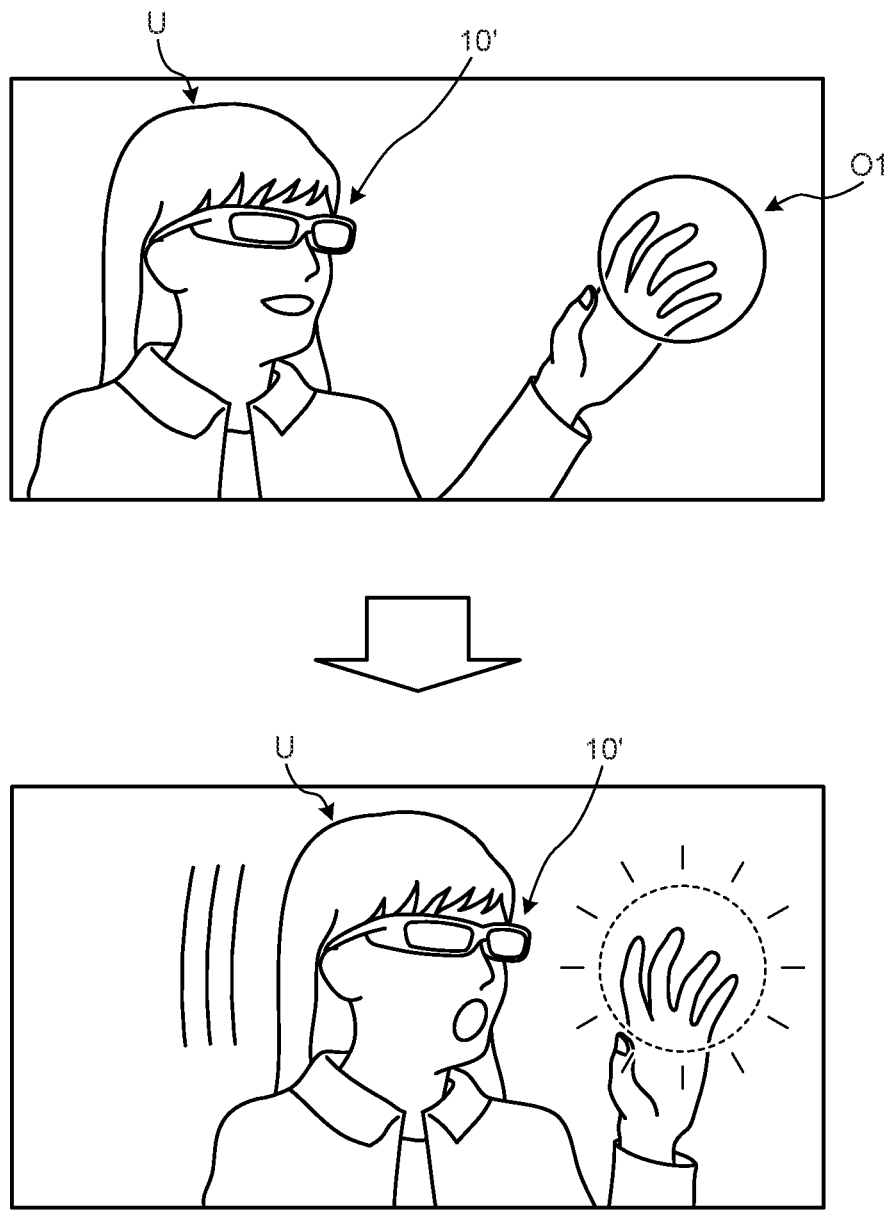
FIG. 3 is an image diagram in a case where data within a short distance is hidden.
Figure 4:
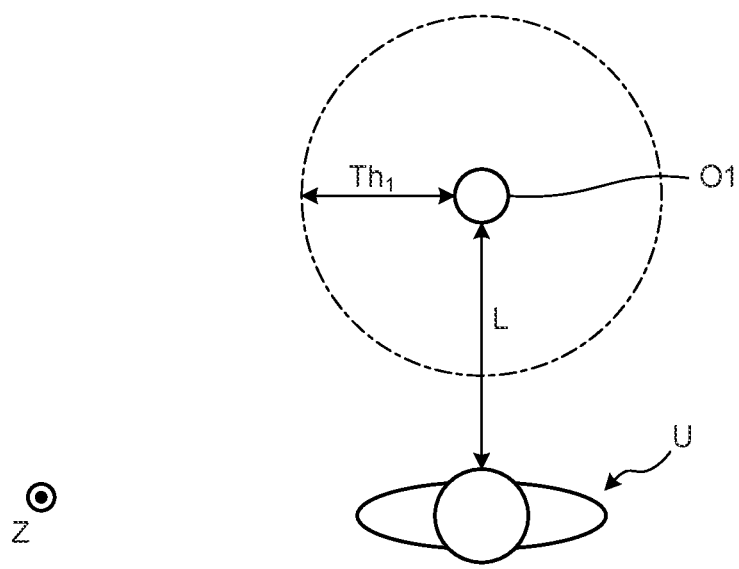
FIG. 4 is a diagram illustrating an outline of an information processing method according to a conventional technology.

Here, the background that led to the creation of the embodiment of the present disclosure will be described in detail with reference to FIGS. 2 to 4. FIG. 2 is a diagram illustrating a relationship between an accommodation distance and a vergence distance in a range of a deviation amount recommended in ISO 9241-392. Furthermore, FIG. 3 is an image diagram in a case where data within a short distance is hidden. Furthermore, FIG. 4 is a diagram illustrating an outline of an information processing method according to a conventional technology.

In recent years, information processing apparatuses 10' that display a virtual object on a display in front of the eyes of the user U, such as AR glasses and HMDs, have become widespread, and in these information processing apparatuses 10', generally, a video is displayed at an optically fixed distance, and the right-eye image and the left-eye image of the virtual object are displayed so as to have a horizontal misalignment therebetween, thereby implementing stereoscopic vision of the virtual object.

Note that, in the present specification, the virtual object means an image that can be stereoscopically viewed by the user U feeling binocular parallax by being displayed in a three-dimensional space. Therefore, the virtual object is not limited to one having a three-dimensional shape, but it is sufficient if, even when the virtual object itself is planar, the virtual object is displayed in a three-dimensional space and visually recognized by the user U as if the virtual object exists at the displayed display position, so that the user can feel binocular parallax. The content of the virtual object is not particularly limited, but may include, for example, a character, an effect, a text, a button, and the like. Furthermore, the three-dimensional space in which the information processing apparatus superimposes the virtual object may be a real space or a virtual space, but an example in which the virtual object is displayed in the real space will be mainly described below.

In a case where the virtual object is displayed in the real space, the display unit that displays the left-eye image and the right-eye image in the information processing apparatus 10' is configured to include, for example, a lens and a small display panel having optical transparency. With such a configuration, a virtual image distance (sometimes referred to as accommodation distance), which is a distance from the user U (more strictly, the eyeball of the user U) to an image of display light focused (accommodated) by the user U with the eyeball, depends on a positional relationship between the lens and the small display panel. Therefore, when the positional relationship is fixed, the virtual image distance at which the virtual object is in focus is also fixed. Note that it is conceivable to make the virtual image distance variable by providing the display unit with a lens driving mechanism, but since the apparatus configuration becomes complicated or large, an example of the display unit having a fixed virtual image distance will be described below. As described above, the virtual image distance and the accommodation distance substantially correspond to each other, and hereinafter, in the context of mainly describing the information processing apparatus, the "virtual image distance" may be used for convenience, and in the context of mainly describing natural vision, the "accommodation distance" may be mainly used for convenience.

On the other hand, the sense of depth given to the user U is affected by the vergence angle, which is an angle determined by the distance (hereinafter, referred to as the "vergence distance") from the user U (more strictly, the eyeball of the user U) to the display position of the virtual object and the spacing (hereinafter referred to as the "pupillary distance") between the left eye and the right eye. Assuming that the vergence distance is D, the pupillary distance is I, and the vergence angle is θ, the relationship of Formula (1) described below is established.

$$\tan(\theta/2) = I/(2*D) \quad (1)$$

In Formula (1) described above, since the pupillary distance I can be said to be fixed for each user U although there is an individual difference depending on the user U, the vergence angle θ for a certain user U is determined by the vergence distance D. Then, the eyeball of the user U moves according to the vergence angle θ determined by the vergence distance D.

Meanwhile, in the case of natural vision in which a real object existing in the real space is observed, the eyeball of the user U adjusts the focus according to the distance from the user U to the real object. Moreover, in the case of natural vision, the eyeball of the user U turns the eyeball according to the corresponding vergence angle with the distance from the user U to the real object as the vergence distance. That is, in the case of natural vision, the accommodation distance and the vergence distance coincide with each other.

However, in the existing information processing apparatus 10', while the virtual image distance is fixed as described above, the virtual object is displayed so as to change the vergence angle in order to give the user U a sense of depth. As a result, unlike the case of natural vision described above, the accommodation distance of the user U and the virtual image distance of the display apparatus substantially coincide with each other. On the other hand, since the accommodation distance and the vergence distance deviate from each other, the deviation can cause the user U to have a burden such as a sense of discomfort or a sense of displeasure. Furthermore, as a result, there is a possibility that symptoms such as sickness occur. This is a so-called "vergence-accommodation conflict problem".

Furthermore, since there are individual differences in the eyeball movement of the user U, there can be a user U who is difficult to fuse and observe the images due to the deviation between the accommodation distance and the vergence distance. Such a user U may be difficult to fuse images with respect to a real object existing at a short distance, and in a case where the accommodation distance and the vergence distance are different from each other, there is a concern that the tendency that fusion is difficult is further promoted.

Regarding this deviation, as illustrated in FIG. 2, in ISO 9241-392, it is recommended that the deviation amount between the vergence angle when the vergence distance coincides with the accommodation distance and the vergence angle according to the actual vergence distance be within +1 degree.

In the case of natural vision indicated by the dashed-dotted line in FIG. 2, the accommodation distance indicated by the horizontal axis and the vergence distance indicated by the vertical axis coincide with each other. The vergence angle in the case of natural vision corresponds to the vergence angle in a case where the above-described vergence distance coincides with the accommodation distance. Note that, in a case where the focus of the user U is on the virtual object, the vergence angle in the case of natural vision in FIG. 2 may be considered to be substantially equal to the vergence angle corresponding to the virtual image distance.

On the other hand, a range in which the vergence angle according to the vergence distance is increased by one degree or more with respect to the vergence angle in the case of natural vision is a region below the curve represented by the solid line in FIG. 2. Furthermore, a range in which the vergence angle according to the vergence distance is decreased by one degree or more with respect to the vergence angle in the case of natural vision is a region above the curve represented by the dashed line in FIG. 2. That is, the recommended range of ISO 9241-392 is a range between the solid line and the dashed line illustrated in FIG. 2.

Since the change in the vergence angle becomes larger in the case of display at a shorter distance, the recommended range becomes narrower as the vergence distance or the accommodation distance is smaller as illustrated in FIG. 2. Depending on an application provided in the information processing apparatus 10' such as the AR glasses or the HMD described above, the distance (vergence distance) to the display position of the virtual object is often a short distance of 2 m or less, and in such a case, there was a possibility that a burden such as a sense of discomfort or a sense of displeasure is given to the user U.

For example, in the information processing apparatus 10' capable of superimposing a virtual object in a real space, a use case is conceivable in which a virtual object is displayed on the hand of the user U as the display position. In this case, it is assumed that the vergence distance, which is the distance from the user U to the display position of the virtual object, is approximately in a range of 30 cm to 70 cm although it varies depending on individual differences in the length of the hand of the user U, the posture, and the like. The vergence angle corresponding to this vergence distance is in a range of seven degrees.

On the other hand, as described above, the deviation amount recommended by ISO 9241-392 is +1 degree, that is, the recommended range is a range of two degrees. Therefore, in a case where the display unit of the display apparatus is designed to have a fixed virtual image distance in consideration of the above-described use case, there is no virtual image distance that allows all the assumed vergence distances to fall within the recommended range. Therefore, in the above-described use case, as long as the virtual image distance of the display unit is fixed, there is a possibility of use beyond the recommended range of ISO 9241-392, and it is considered that a burden such as a sense of discomfort or a sense of displeasure is likely to be given to the user U.

For this reason, in the currently commercially available information processing apparatuses 10', as illustrated as an image diagram in FIG. 3, in a case where the user U approaches a virtual object O1 at a predetermined short distance, for example, the vergence-accommodation conflict problem is avoided by performing processing of hiding the virtual object O1. Note that, although the entire virtual object O1 is hidden in the example of FIG. 3, a part of the virtual object O1 located within a predetermined short distance may be hidden.

On the other hand, there are many situations in which it is desired to display a 3D model of a design object in full size, visually observe the 3D model at a very short distance as in a real action, and finely observe the state of the surface and fine portions, for example, in a scene of industrial product design support. Thus, in order to respond to such a situation, there is a conventional technology in which when a virtual object is displayed within a predetermined short distance, an image is displayed only on one eye side.

Such conventional technology is illustrated in FIG. 4. Note that, in FIG. 4, the user U and the virtual object O1 are very schematically illustrated in plan view in a coordinate system including a Z axis in which vertically upward is a positive direction.

In FIG. 4, "$Th_1$" is a predetermined short distance threshold value. The short distance threshold value $Th_1$ is preset to a value at which the vergence-accommodation conflict problem does not significantly occur. The short distance threshold value $Th_1$ is, for example, about 40 cm. Furthermore, "L" is a distance from the eye of the user U to the display position of the virtual object O1. The distance L is appropriately calculated according to a change in the distance between the user U and the virtual object O1.

As illustrated in FIG. 4, in the information processing method according to the conventional technology, in the case of "distance L>short distance threshold value $Th_1$", the right-eye image and the left-eye image of the virtual object O1 are normally displayed on both a right-eye display 121' and a left-eye display 122'. Furthermore, in the case of "distance L≤short distance threshold value $Th_1$", the right-eye image or the left-eye image of the virtual object O1 is hidden on one of the right-eye display 121' and the left-eye display 122'.

Hence, it is possible to obtain an effect of solving the vergence-accommodation conflict problem in the short distance display. However, for example, displaying the virtual object O1 only on one eye side causes a problem such as flickering of the visual field for the user U.

In particular, in the case of performing superimposition display of the virtual object O1 on a real object, it is a burden for the user U to simultaneously perform the visual observation of the real object with both eyes and the visual observation of the virtual object O1 with only one eye by the display on only one eye side.

Furthermore, for example, in a case where the distance L gradually decreases, the display is unexpectedly switched to only one eye side, which also becomes a burden for the user U.

1-3. Outline of the Present Embodiment

Thus, in the information processing apparatus 10 causing the user U of the head mounted display to perceive the depth position of the virtual object by controlling the display positions of the right-eye image and the left-eye image related to the virtual object, the information processing method according to the embodiment of the present disclosure determines an opened/closed state of an eye of the user U on the basis of a detection result of the sensor 11 that detects the visual recognition state of both eyes of the user, calculates the display position in a depth direction of the virtual object, and in a case where it is determined that the display position in the depth direction is within the short distance threshold value $Th_1$ indicating a predetermined short distance and both eyes of the user U are opened, reduces the visibility of the right-eye image and the left-eye image related to the virtual object, and in a case where it is determined that the display position in the depth direction is within the short distance threshold value $Th_1$ and only one eye of the user U is opened, increases the visibility reduced at least with respect to the display of the one eye.

FIG. 5 is a diagram illustrating an outline of the information processing method according to the embodiment of the present disclosure. Specifically, in the information processing method according to the embodiment, as illustrated in FIG. 5, in the case of "distance L>short distance threshold value $Th_1$", the right-eye image and the left-eye image of the virtual object O1 are normally displayed on both the right-eye display 121 and the left-eye display 122. This is similar to the conventional technology illustrated in FIG. 4.

On the other hand, in the information processing method according to the embodiment, as illustrated in FIG. 5, in the case of "distance L≤ short distance threshold value $Th_1$", the opened/closed states of both eyes of the user U are detected, and the display/hiding of the virtual object O1 on each of the right-eye display 121 and the left-eye display 122 is switched according to the combination of the opened/closed states of the right eye and the left eye.

More specifically, in the information processing method according to the embodiment, in the case of "distance L≤ short distance threshold value $Th_1$" and the state where both eyes are opened, the right-eye image and the left-eye image of the virtual object O1 are hidden on both the right-eye display 121 and the left-eye display 122.

Furthermore, in the case of "distance L≤ short distance threshold value $Th_1$" and the state where only the right eye is opened, the right-eye image of the virtual object O1 is displayed only on the right-eye display 121, and the image is hidden on the left-eye display 122.

Furthermore, in the case of "distance L≤ short distance threshold value $Th_1$" and the state where only the left eye is opened, the left-eye image of the virtual object O1 is displayed only on the left-eye display 122, and the image is hidden on the right-eye display 121.

That is, in the information processing method according to the embodiment, in the case of "distance L≤ short distance threshold value $Th_1$" and the state where only one eye is opened, the virtual object O1 is displayed only for the eye on the open side, and the virtual object O1 is not displayed for the eye on the closed side.

Hence, by creating a rule "short distance display is possible only when viewing with one eye", it is possible to implement short distance display of the virtual object O1 without causing the vergence-accommodation conflict problem.

Furthermore, the user U performs an action "close one eye and approach the virtual object O1 to perform short distance display" after understanding the above rule. Hence, it is possible to implement the short distance display of the virtual object O1 without causing the problem of "unintended change in display state".

Therefore, according to the information processing method according to the embodiment, it is possible to display the virtual object O1 within a short distance while reducing the burden on the user U.

Note that "hiding" described above can be broadly paraphrased as "reduce the visibility".

Furthermore, in order to cause the user U to recognize that "the display disappears when approaching any more in the state of viewing with both eyes", an intermediate distance threshold value $Th_2$ larger than the short distance threshold value $Th_1$ may be provided, and a buffer area may be formed between the intermediate distance threshold value $Th_2$ and the short distance threshold value $Th_1$. Then, in such a buffer area, the visibility of the virtual object O1 may be gradually reduced. Such a modification will be described below with reference to FIGS. 10 to 12.

Furthermore, in FIG. 5, the state in which both eyes are closed is omitted, but when both eyes are closed, the user U simply cannot perform visual recognition of the virtual object O1, and the display state of the right-eye display 121 and the left-eye display 122 is not limited.

Furthermore, even in a state where only one eye is opened, the eye on the closed side simply cannot visually recognize the virtual object O1, so that the virtual object O1 may be displayed on the closed side.

Furthermore, here, the opened/closed state of the eye indicating, which indicates the blocked state of the eye by the eye lid, is detected, but it is sufficient that the field of view of the user U is blocked, and in that sense, the field of view may be blocked by holding the hand or the like. Such a modification will be described below with reference to FIGS. 13 and 14.

Hereinafter, a configuration example of the information processing apparatus 10 to which the information processing method according to the above-described embodiment is applied will be described more specifically.

2. CONFIGURATION OF INFORMATION PROCESSING APPARATUS

Figure 6:
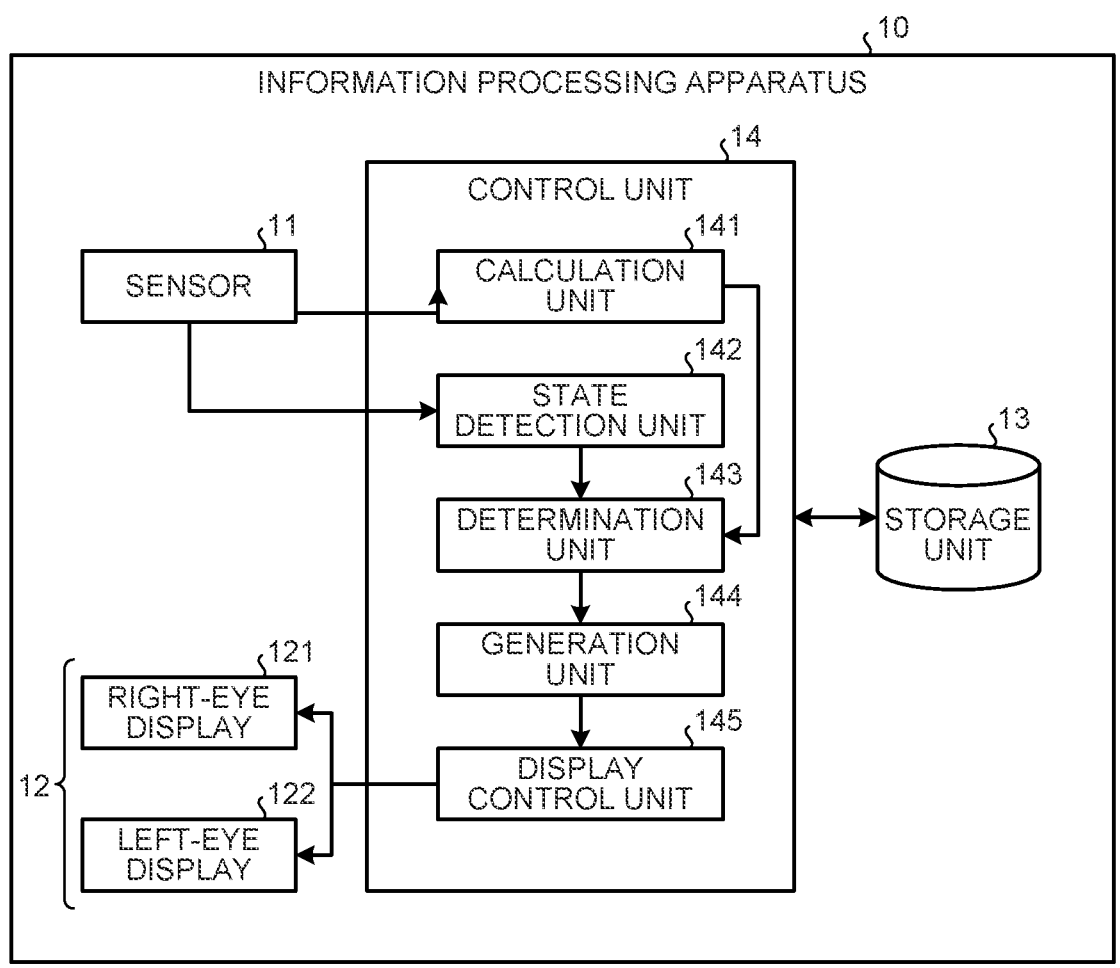
FIG. 6 is a block diagram illustrating a configuration example of the information processing apparatus according to the embodiment of the present disclosure.

FIG. 6 is a block diagram illustrating a configuration example of the information processing apparatus 10 according to the embodiment of the present disclosure. Note that, in FIG. 6, only components necessary for describing features of the embodiment are illustrated, and description of general components is omitted.

In other words, each component illustrated in FIG. 6 is functionally conceptual, and is not necessarily physically configured as illustrated in the drawing. For example, a specific form of distribution and integration of blocks is not limited to those illustrated, and all or a part thereof can be functionally or physically distributed and integrated in an arbitrary unit according to various loads, usage situations, and the like.

Furthermore, in the description using FIG. 6, the description of the already described components may be simplified or omitted.

As illustrated in FIG. 6, the information processing apparatus 10 includes the sensor 11, the display unit 12, a storage unit 13, and a control unit 14.

As described above, the sensor 11 is a sensor that senses various environmental information regarding the environment surrounding the user U, various state information regarding the state of the user U, and the like. The sensor 11 detects the line of sight of the user U or the visual recognition state of both eyes of the user U by detecting an object that blocks the front of the eyes of the user U.

In a case where the sensor 11 functions as the above-described recognition camera, the sensor 11 recognizes a subject (that is, a real object located in a real space) located in front of the information processing apparatus 10. Furthermore, the sensor 11 acquires an image of the subject located in front of the user U in a stereo configuration. The distance from the information processing apparatus 10 to the subject can be calculated on the basis of the parallax between the acquired images.

Furthermore, in a case where the sensor 11 functions as a sensor that senses the opened/closed state of both eyes of the user U, the sensor 11 acquires an image of the eyes of the user U. Then, the sensor 11 recognizes the direction in which the line of sight of the right eye is directed on the basis of the captured image of the eyeball of the right eye of the user U and the positional relationship with respect to the right eye. Similarly, the sensor 11 recognizes the direction in which the line of sight of the left eye is directed on the basis of the captured image of the eyeball of the left eye of the user U and the positional relationship with respect to the left eye. When the line of sight cannot be recognized, the eye is closed.

Therefore, the sensor 11 includes a camera the imaging direction of which is the front of the information processing apparatus 10 and a camera the imaging direction of which is the eye of the user U.

Note that the sensor 11 may have a function of sensing various types of information regarding the motion of the user U, such as the orientation, inclination, movement, and movement speed of the body of the user U, in addition to the functions described above. Specifically, the sensor 11 senses, as information regarding the motion of the user U, information regarding the head and posture of the user U, the movement (acceleration and angular velocity) of the head and body of the user U, the direction of the visual field, the speed of viewpoint movement, and the like.

For example, the sensor 11 functions as various motion sensors such as a three-axis acceleration sensor, a gyro sensor, and a velocity sensor, and senses information regarding the motion of the user U. More specifically, the sensor 11 can sense a change in at least one of the position of the head and posture of the user U by detecting components in the yaw direction, the pitch direction, and the roll direction as the movement of the head of the user U. Note that the sensor 11 is not necessarily required to be provided in the information processing apparatus 10, and may be, for example, an external sensor connected to the information processing apparatus 10 in a wired or wireless manner.

Since the display unit 12 has already been described, the description thereof will be omitted here. The storage unit 13 is implemented by, for example, a storage device such as a semiconductor memory element such as random access memory (RAM), read only memory (ROM), or flash memory. The storage unit 13 stores, for example, various programs operating in the information processing apparatus 10, the above-described short distance threshold value $Th_1$ and intermediate distance threshold value $Th_2$, various types of information regarding drawing of the virtual object O1, and the like.

The control unit 14 is a controller, and is implemented by, for example, a central processing unit (CPU), a micro processing unit (MPU), or the like executing various programs stored in the storage unit 13 using the RAM as a work area. Furthermore, the control unit 14 can be implemented by, for example, an integrated circuit such as an application specific integrated circuit (ASIC), a field programmable gate array (FPGA), or the like.

The control unit 14 includes a calculation unit 141, a state detection unit 142, a determination unit 143, a generation unit 144, and a display control unit 145, and implements or executes the function and the operation of information processing described below.

The calculation unit 141 calculates the above-described distance L, which is the distance from the eye of the user U to the display position of the virtual object O1, on the basis of the sensing result of the sensor 11. Note that the calculation unit 141 calculates the distance L not only for the virtual object O1 but also for each of all virtual objects existing in the field of view of the user U. Furthermore, the calculation unit 141 notifies the determination unit 143 of the calculated calculation result.

The state detection unit 142 detects the blocked state of the field of view of the user U on the basis of the sensing result of the sensor 11. Specifically, the state detection unit 142 detects the opened/closed state of each of both eyes of the user U. Furthermore, the state detection unit 142 notifies the determination unit 143 of the detected detection result.

The determination unit 143 determines the display mode of the right-eye display 121 and the left-eye display 122 on the basis of the notified calculation result of the calculation unit 141 and the notified detection result of the state detection unit 142. Specifically, in the case of "distance L≤ short distance threshold value $Th_1$", the determination unit 143 determines the display mode so as to perform hiding for the eye on the closed side and reduce the visibility (see FIG. 5). Furthermore, the determination unit 143 notifies the generation unit 144 of the determined determination result.

The generation unit 144 generates image data to be displayed on the display unit 12 on the basis of the determination result of the determination unit 143. Furthermore, the generation unit 144 notifies the display control unit 145 of the generated image data.

The display control unit 145 controls the display of each of the right-eye display 121 and the left-eye display 122 on the basis of the determination result of the determination unit 143 and the image data generated by the generation unit 144. For example, the display control unit 145 reduces the visibility according to the positional relationship of the display position in the depth direction of the virtual object O1 calculated by the calculation unit 141 with respect to the area within the short distance threshold value $Th_1$.

3. PROCESSING PROCEDURE OF INFORMATION PROCESSING APPARATUS

Figure 7:
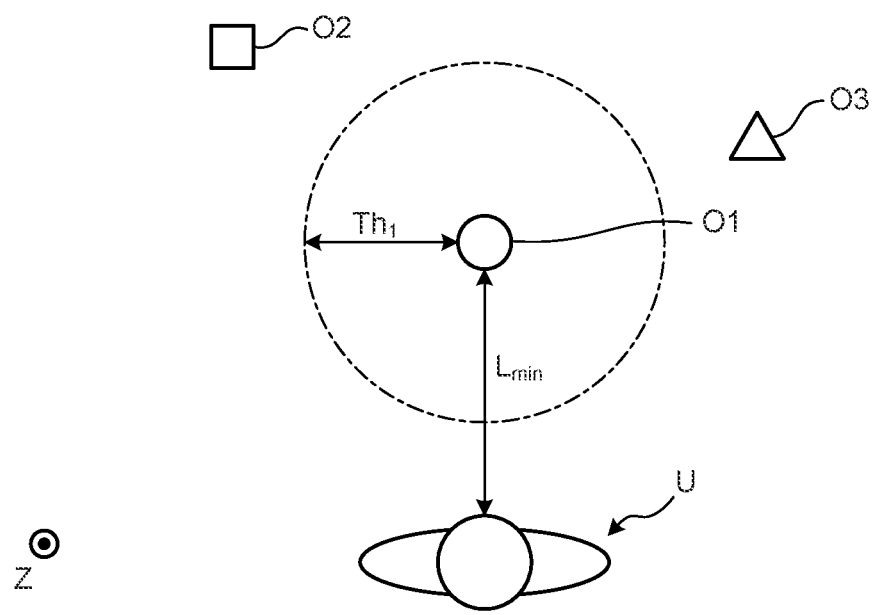
FIG. 7 is a diagram illustrating preconditions of processing procedures illustrated in FIGS. 8 and 9.
Figure 8:
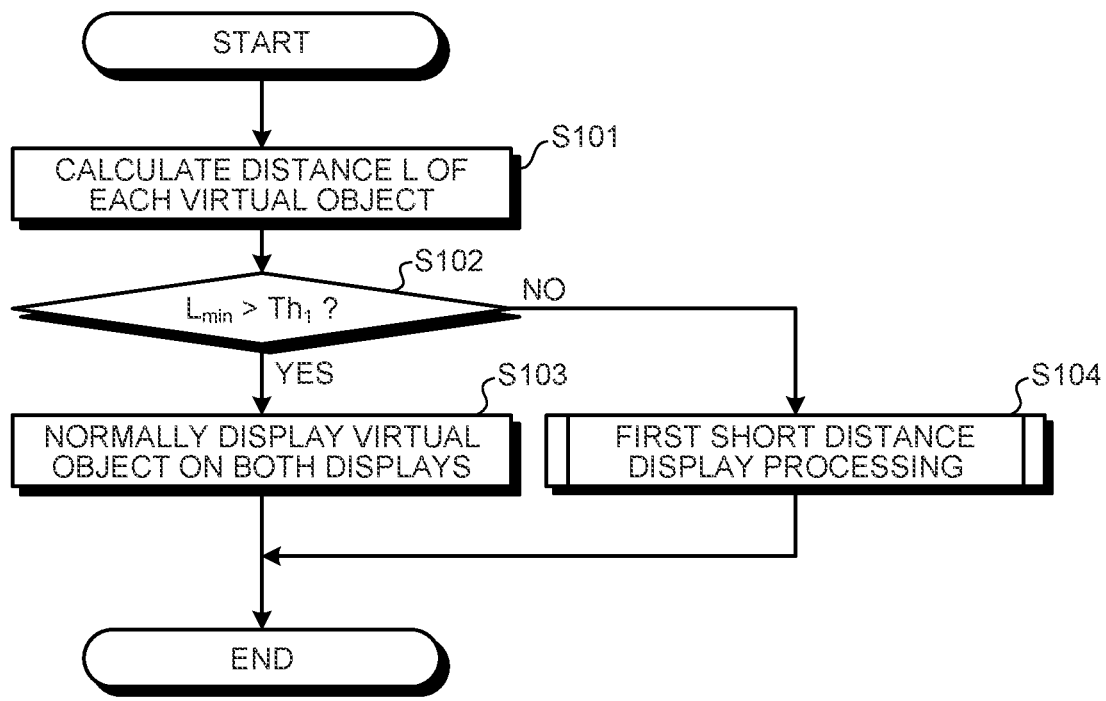
FIG. 8 is a flowchart illustrating a processing procedure executed by the information processing apparatus according to the embodiment.
Figure 9:
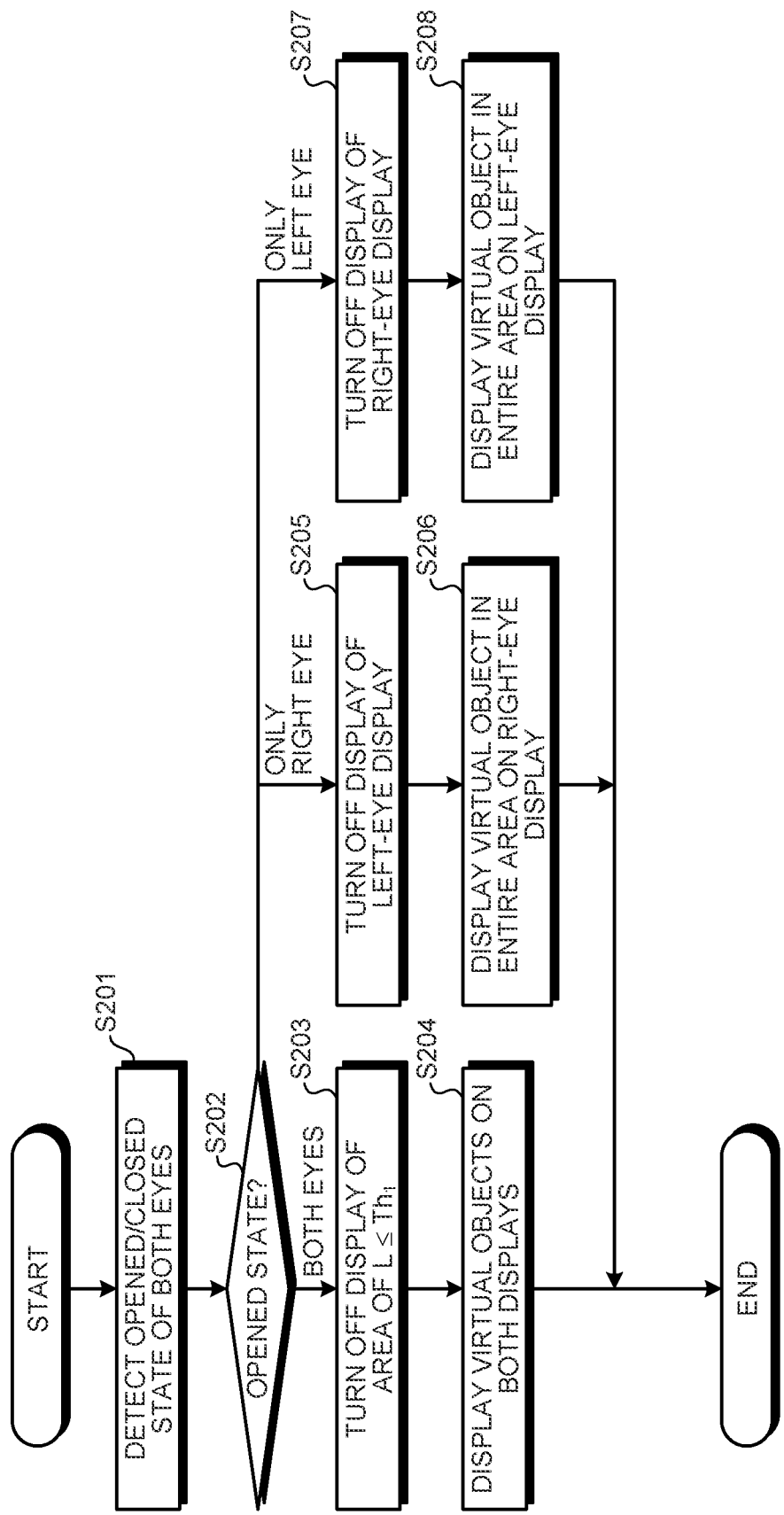
FIG. 9 is a flowchart illustrating a processing procedure of first short distance display processing illustrated in FIG. 8.

Next, a processing procedure executed by the information processing apparatus 10 according to the embodiment will be described with reference to FIGS. 7 to 9. FIG. 7 is a diagram illustrating preconditions of processing procedures illustrated in FIGS. 8 and 9. Furthermore, FIG. 8 is a flowchart illustrating a processing procedure executed by the information processing apparatus 10 according to the embodiment. Furthermore, FIG. 9 is a flowchart illustrating a processing procedure of first short distance display processing illustrated in FIG. 8. Note that the processing procedures illustrated in FIGS. 8 and 9 correspond to one-time calculation of the distance L.

First, as illustrated in FIG. 7, it is assumed that a plurality of virtual objects O1, O2, O3 . . . exists around the user U as display elements, and as a result of calculating the above-described distance L for each of these, the minimum value is the distance L related to the virtual object O1. Hereinafter, the distance L having the minimum value is referred to as a "distance $L_{min}$".

As illustrated in FIG. 8, first, the calculation unit 141 calculates the distance L of each of the virtual objects O1, O2, O3 . . . (Step S101). Then, the determination unit 143 determines whether or not "distance $L_{min}$>short distance threshold value $Th_1$" (Step S102).

Here, in the case of "distance $L_{min}$>short distance threshold value $Th_1$" (Step S102, Yes), the display control unit 145 normally displays the virtual objects O1, O2, O3 . . . on both displays of the right-eye display 121 and the left-eye display 122 (Step S103), and ends the processing.

On the other hand, in the case of not "distance $L_{min}$>short distance threshold value $Th_1$" (Step S102, No), that is, in the case of "distance $L_{min}$≤ short distance threshold value $Th_1$", the display control unit 145 executes the first short distance display processing (Step S104), and then ends the processing.

As illustrated in FIG. 9, in the first short distance display processing, the state detection unit 142 detects the opened/closed state of both eyes of the user U (Step S201). Then, the determination unit 143 determines which eye is in the opened state (Step S202).

Here, in a case where both eyes are in the opened state (Step S202, both eyes), the display control unit 145 turns off the display such that the short distance area in which the distance L is equal to or less than the short distance threshold value $Th_1$ is hidden (Step S203), displays the virtual objects O2, O3 . . . on both displays of the right-eye display 121 and the left-eye display 122 (Step S204), and ends the processing.

Furthermore, when only the right eye is in the opened state (Step S202, only right eye), the display control unit 145 turns off the display for the short distance area of the left-eye display 122 (Step S205), displays the virtual objects O1, O2, O3 . . . in the entire area of the right-eye display 121 (Step S206), and ends the processing.

Furthermore, when only the left eye is in the opened state (Step S202, only left eye), the display control unit 145 turns off the display for the short distance area of the right-eye display 121 (Step S207), displays the virtual objects O1, O2, O3 . . . in the entire area of the left-eye display 122 (Step S208), and ends the processing.

4. MODIFICATIONS

Incidentally, in order to cause the user U to recognize that "the display disappears when approaching any more in the state of viewing with both eyes", the intermediate distance threshold value $Th_2$ larger than the short distance threshold value $Th_1$ may be provided, and the buffer area may be formed between the intermediate distance threshold value $Th_2$ and the short distance threshold value $Th_1$. Then, in such a buffer area, the visibility of the virtual object O1 may be gradually reduced. Such a case will be described as a first modification with reference to FIGS. 10 to 12.

4-1. First Modification

Figure 11:
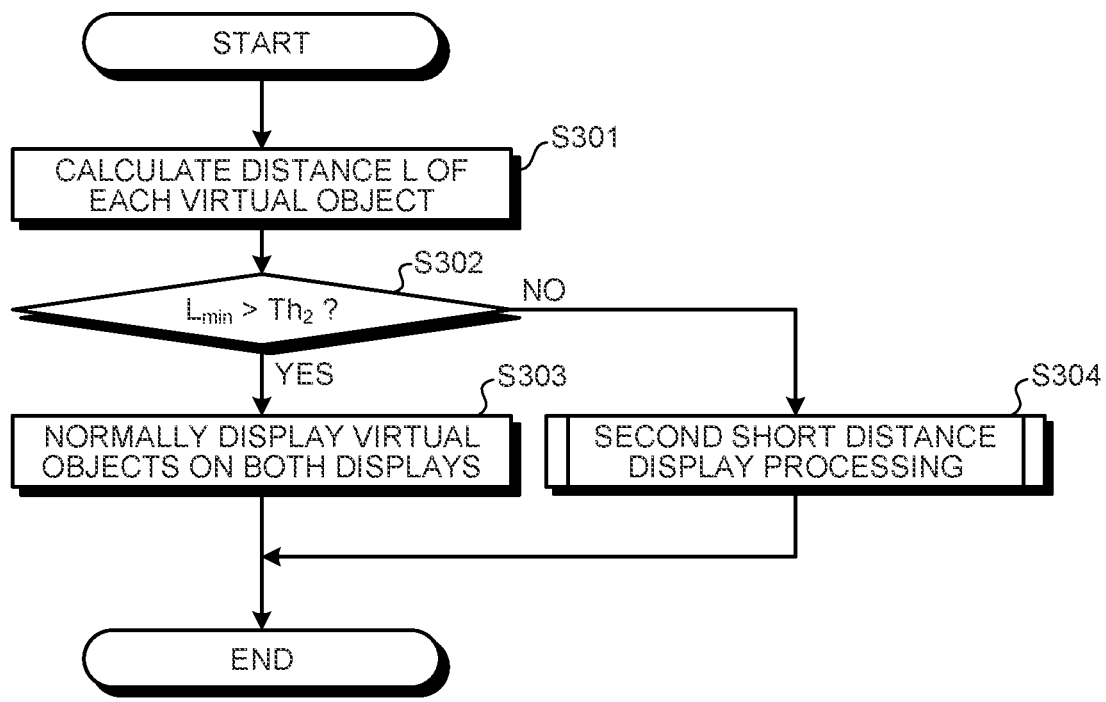
FIG. 11 is a flowchart illustrating a processing procedure according to the first modification.
Figure 12:
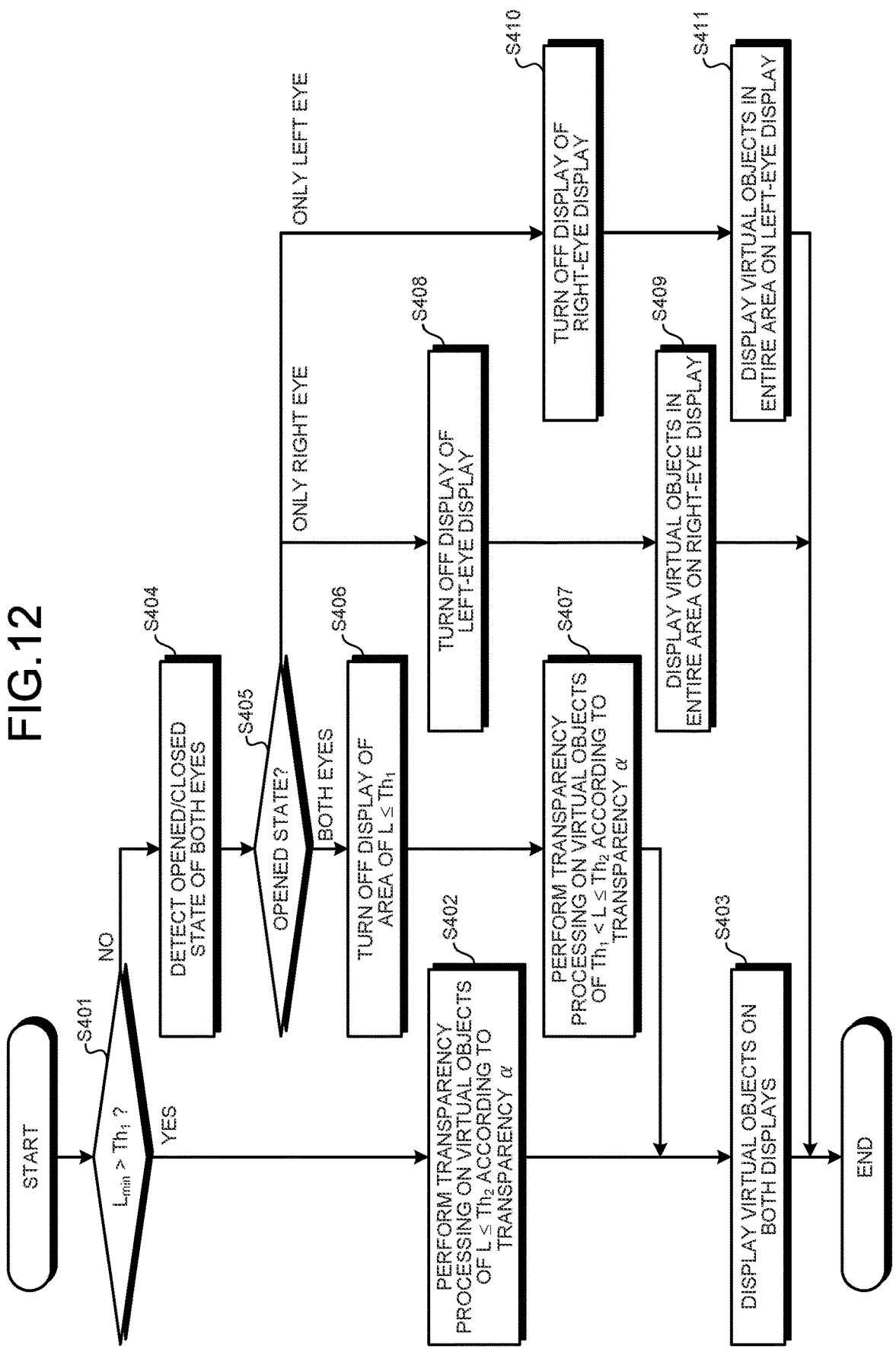
FIG. 12 is a flowchart illustrating a processing procedure of second short distance display processing illustrated in FIG. 11.

FIG. 10 is an explanatory diagram of an information processing method according to the first modification. Furthermore, FIG. 11 is a flowchart illustrating a processing procedure according to the first modification. Furthermore, FIG. 12 is a flowchart illustrating a processing procedure of second short distance display processing illustrated in FIG. 11.

Note that FIG. 10 corresponds to FIG. 5, and portions different from those in FIG. 5 will be mainly described in the description using FIG. 10.

Specifically, in the information processing method according to the first modification, as illustrated in FIG. 10, the intermediate distance threshold value $Th_2$ larger than the short distance threshold value $Th_1$ is set in advance. The intermediate distance threshold value $Th_2$ is, for example, about 50 cm. Therefore, the buffer area is formed between the intermediate distance threshold value $Th_2$ and the short distance threshold value $Th_1$.

Then, in the information processing method according to the first modification, in the case of "intermediate distance threshold value $Th_2 \geq$ distance L>short distance threshold value $Th_1$" in which the distance L is within the buffer area, the visibility is reduced by, for example, transparently displaying the virtual object O1 on both the right-eye display 121 and the left-eye display 122.

Such transparent display can be implemented, for example, by performing transparency processing with a transparency $\alpha$ calculated by formula "transparency $\alpha$=(distance L−short distance threshold value $Th_1$)/(intermediate distance threshold value $Th_2$−short distance threshold value $Th_1$)*0.5+0.5" as illustrated in FIG. 10. According to the transparency processing with the transparency $\alpha$, the visibility can be gradually reduced as the distance L approaches the short distance threshold value $Th_1$.

Hence, the user U recognizes to be close to the short distance threshold value $Th_1$ as a part of the display area gradually becomes transparent, and by closing one eye, even when the distance L becomes equal to or less than the short distance threshold value $Th_1$, the user U can intentionally make a transition to the state where the virtual object O1 is visually recognizable.

Note that, heretofore, it has been assumed that the distance L gradually decreases, that is, the user U gradually approaches the virtual object O1 or the virtual object O1 gradually moves toward the user U, but in a case where the distance L suddenly becomes the short distance threshold value $Th_1$ or less discontinuously, the virtual object O1 may be started to be displayed in a state of low visibility and then gradually transition to be hidden.

Next, the processing procedure according to the first modification will be described. Note that the processing procedures illustrated in FIGS. 11 and 12 correspond to one-time calculation of the distance L as illustrated in FIGS. 8 and 9.

As illustrated in FIG. 11, first, the calculation unit 141 calculates the distance L of each of the virtual objects O1, O2, O3 . . . (Step S301). Then, the determination unit 143 determines whether or not "distance $L_{min}$>intermediate distance threshold value $Th_2$" (Step S302).

Here, in the case of "distance $L_{min}$>intermediate distance threshold value $Th_2$" (Step S302, Yes), the display control unit 145 normally displays the virtual objects O1, O2, O3 . . . on both displays of the right-eye display 121 and the left-eye display 122 (Step S303), and ends the processing.

On the other hand, in the case of not "distance $L_{min}$>intermediate distance threshold value $Th_2$" (Step S302, No), that is, in the case of "distance $L_{min} \leq$ intermediate distance threshold value $Th_2$", the display control unit 145 executes the second short distance display processing (Step S304), and then ends the processing.

As illustrated in FIG. 12, in the second short distance display processing, the determination unit 143 determines whether or not "distance $L_{min}$>short distance threshold value $Th_1$" (Step S401).

Here, in the case of "distance $L_{min}$>short distance threshold value $Th_1$" (Step S401, Yes), the display control unit 145 performs the transparency processing on the virtual objects O1, O2, O3 . . . at the distance L equal to or less than the intermediate distance threshold value $Th_2$ according to the transparency $\alpha$ (Step S402). Then, the virtual objects O1, O2, O3 . . . are displayed on both displays of the right-eye display 121 and the left-eye display 122 (Step S403), and the processing ends.

On the other hand, in the case of not "distance $L_{min}$>short distance threshold value $Th_1$" (Step S401, No), that is, in the case of "distance $L_{min} \leq$ short distance threshold value $Th_1$", the state detection unit 142 detects the opened/closed state of both eyes of the user U (Step S404). Then, the determination unit 143 determines which eye is in the opened state (Step S405).

Here, in a case where both eyes are in the opened state (Step S405, both eyes), the display control unit 145 turns off the display for the short distance area of "distance $L \leq$ short distance threshold value $Th_1$" (Step S406). Then, the transparency processing is performed on the virtual objects O1, O2, O3 . . . at the distance L larger than the short distance threshold value $Th_1$ and equal to or less than the intermediate distance threshold value $Th_2$ according to the transparency $\alpha$ (Step S407). Then, Step S403 is executed, and the processing ends.

Furthermore, when only the right eye is in the opened state (Step S405, only right eye), the display control unit 145 turns off the display for the short distance area of the left-eye display 122 (Step S408), displays the virtual objects O1, O2, O3 . . . in the entire area of the right-eye display 121 (Step S409), and ends the processing.

Furthermore, when only the left eye is in the opened state (Step S405, only left eye), the display control unit 145 turns off the display for the short distance area of the right-eye display 121 (Step S410), displays the virtual objects O1, O2, O3 . . . in the entire area of the left-eye display 122 (Step S411), and ends the processing.

Note that, in the first modification, the transparency processing with the above-described transparency $\alpha$ is performed, but the transparency processing may be simply performed by lowering brightness, lowering display density, or the like. Furthermore, in the first modification, the visibility is reduced by the transparency processing, but the visibility may be reduced by blurring processing by lowering the display resolution, a mode of contour display, a mode of interval display, or the like. In the case of interval display, the longer the spacing of intervals, the lower the visibility. That is, the display control unit 145 reduces the visibility by controlling the display mode of the virtual object.

Furthermore, although the opened/closed state of both eyes of the user U has been detected so far, for example, since there is a user U who has difficulty in closing only one eye, the user U may block the field of view by holding the hand or the like. Such a case will be described as a second modification with reference to FIGS. 13 and 14.

4-2. Second Modification

Figure 13:
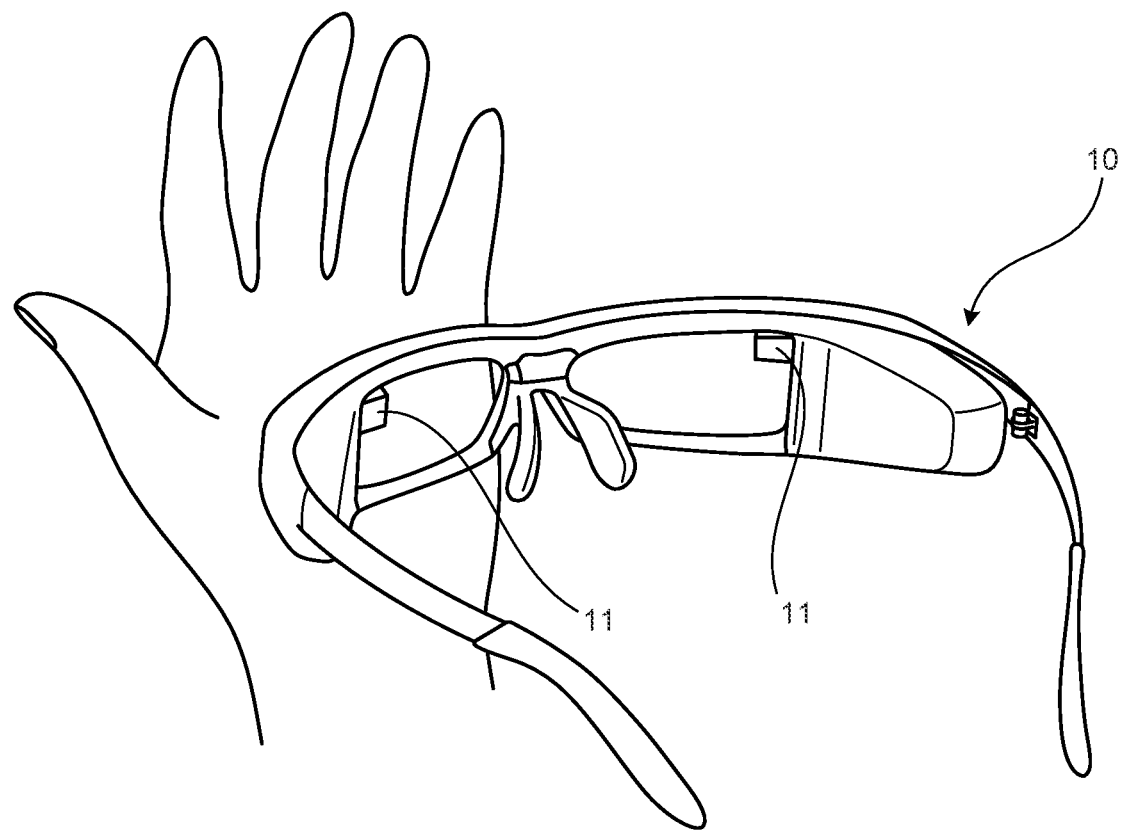
FIG. 13 is an explanatory diagram (Part 1) of an information processing method according to a second modification.

FIG. 13 is an explanatory diagram (Part 1) of an information processing method according to the second modification. Furthermore, FIG. 14 is an explanatory diagram (Part 2) of the information processing method according to the second modification.

The opened/closed state of both eyes of the user U can be detected by the sensor 11, for example, as described above. On the other hand, there is a user U who has difficulty in performing the motion of closing only one eye like a wink, and therefore, instead of controlling the opened/closed state of the eye, the user U may hold the hand in front of the eye to block the field of view of either the right eye or the left eye.

Figure 14:
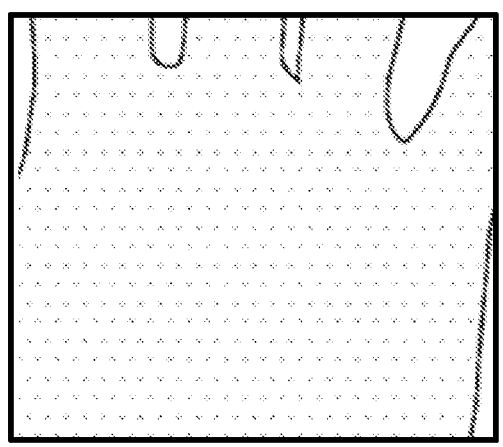
FIG. 14 is an explanatory diagram (Part 2) of the information processing method according to the second modification.

In such a case, as illustrated in FIG. 13, a state in which the field of view of the user U is blocked by the hand as illustrated in FIG. 14 is detected from the image acquired by the recognition camera that is included in the sensor 11 and recognizes the space in front of the eyes of the user U, and on the basis of this, it is determined that one of the eyes is "covered/not covered", so that the same display control as before can be performed. Of course, the "covered" state corresponds to the "closed" state.

Note that since the user U may select either the action of closing the eyes or the action of holding the hand, the processing by the two determination methods may be executed in parallel. However, in the description with reference to FIG. 5, in the case of being based on the opened/closed state of the eyes, it is not necessary to turn off the display since the virtual object O1 cannot simply be visually recognized with the eye on the closed side, but in the case of holding the hand, the display content of the display unit 12 can be visually recognized with the eye on the blocked side, and thus, it is essential to turn off the display.

4-3. Other Modifications

Other modifications can be made. As described in "1-2. Background", a main object of the embodiment of the present disclosure is to solve the problem of the conventional technique of not performing the short distance display and to enable the short distance display in the single-eye state in order to avoid the occurrence of the vergence-accommodation conflict. The vergence-accommodation conflict occurs when the focal length of an optical system is fixed as a premise, but in recent years, AR glasses, HMDs, and the like capable of adjusting the focal length have been actively proposed.

In such a case, the vergence-accommodation conflict does not occur, but for example, when the display at a very short distance such as 10 cm in front of the eyes is viewed, a double image is generated beyond the cross-eyed limit of the user U, and the target cannot be visually recognized correctly.

However, when the display control as described above is applied, the display at a very short distance such as 10 cm can be visually recognized with one eye. Note that, in a case where a real object is visually recognized in natural vision, in a case where there is a target at a very short distance such as 10 cm, in addition to generation of a double image due to exceeding the cross-eyed limit, the target is too close to be out of focus of the eyes and is visually recognized as a blurred image. That is, the generation of a double image can be suppressed by viewing the real object with one eye, but the visually recognized image is blurred.

On the other hand, in a case where the focal length is adjustable in the information processing apparatus 10, in a case where the virtual object O1 existing at a very short distance such as 10 cm is displayed, the size of the virtual object O1 is controlled to be displayed large so as to correspond to the short distance display of 10 cm, and the focal length is controlled not to be smaller than a certain value (for example, 20 m), so that the virtual object O1 at a very short distance of 10 cm can be displayed in detail without causing blurring. Such processing is effective, for example, in a case where it is desired to visually observe the 3D model of a design object at a very short distance and to finely observe the state of the surface and the fine portions, for example, in a scene of industrial product design support described above.

Furthermore, among the pieces of processing described in the above embodiment, all or some of the pieces of processing described as being performed automatically can be performed manually, or all or some of the pieces of processing described as being performed manually can be performed automatically by a known method. In addition, the processing procedures, the specific names, and the information including various data and parameters indicated in the document and the drawings can be arbitrarily changed unless otherwise specified. For example, the various information illustrated in each drawing are not limited to the illustrated information.

Furthermore, each component of each apparatus illustrated in the drawings is functionally conceptual, and is not necessarily physically configured as illustrated in the drawings. That is, a specific form of distribution and integration of apparatuses is not limited to those illustrated, and all or a part thereof can be functionally or physically distributed and integrated in an arbitrary unit according to various loads, usage situations, and the like.

Furthermore, the above-described embodiment can be appropriately combined within an area not contradicting processing contents. Furthermore, the order of each step illustrated in the sequence diagram or the flowchart of the present embodiment can be changed as appropriate.

5. HARDWARE CONFIGURATION

Figure 15:
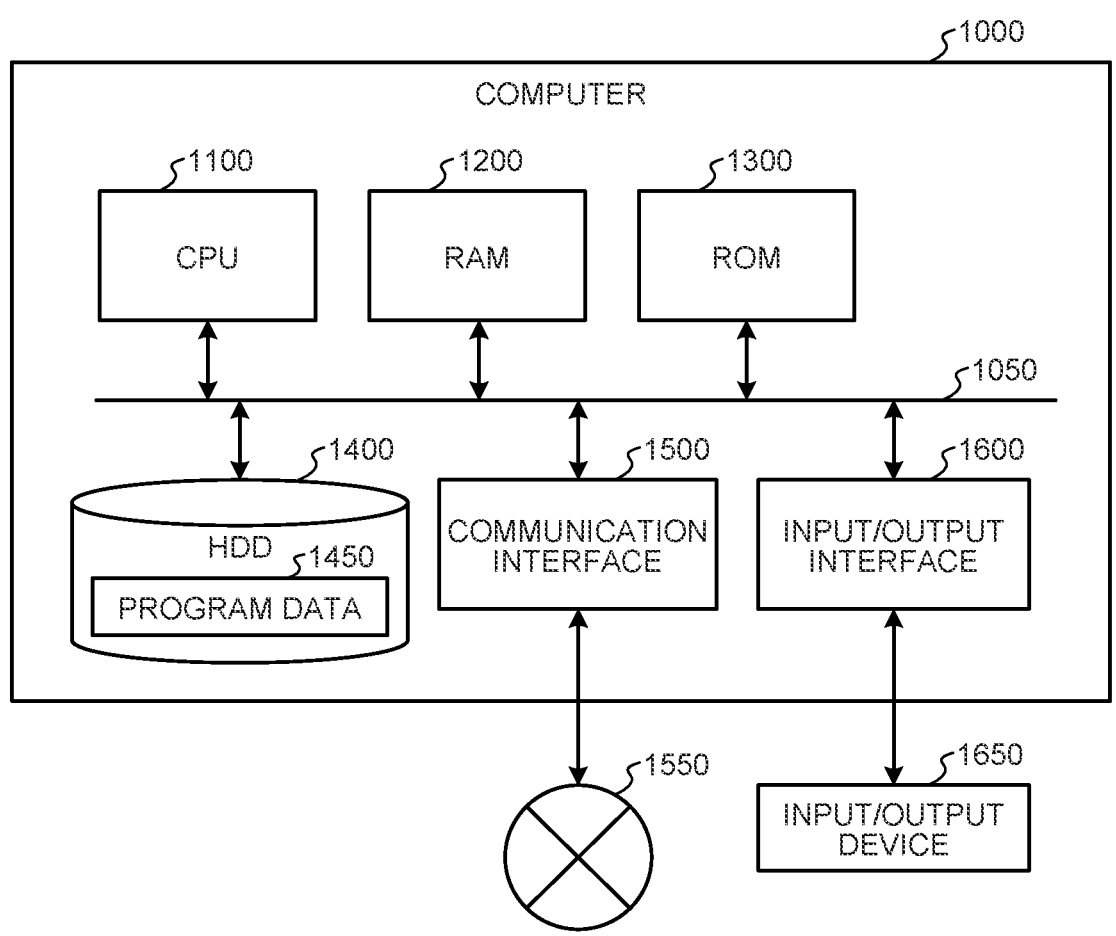
FIG. 15 is a hardware configuration diagram illustrating an example of a computer that implements a function of the information processing apparatus.

An information device such as the information processing apparatus 10 according to the above-described embodiment is implemented by a computer 1000 having the configuration as illustrated, for example, in FIG. 15. Hereinafter, a terminal apparatus 100 according to the embodiment will be described as an example. FIG. 15 is a hardware configuration diagram illustrating an example of the computer 1000 that implements the function of the information processing apparatus 10. The computer 1000 includes a CPU 1100, RAM 1200, a ROM 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from the input device such as a keyboard and a mouse via the input/output interface 1600. Furthermore, the CPU 1100 transmits data to the output device such as a display, a speaker, a printer, or the like via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 10 according to the embodiment, the CPU 1100 of the computer 1000 executes an information processing program loaded on the RAM 1200 to implement the functions of the calculation unit 141, the state detection unit 142, the determination unit 143, the generation unit 144, the display control unit 145, and the like. Furthermore, the HDD 1400 stores an information processing program according to the present disclosure and data in the storage unit 13. Note that the CPU 1100 reads the program data 1450 from the HDD 1400 and executes the program data, but as another example, these programs may be acquired from another apparatus via the external network 1550.

6. CONCLUSION

As described above, according to an embodiment of the present disclosure, the information processing apparatus 10 is an information processing apparatus causing the user U of the head mounted display to perceive a depth position of a virtual object by controlling the display positions of the right-eye image and the left-eye image related to the virtual object, the information processing apparatus 10 including the determination unit 143 that determines the opened/closed state of an eye of the user U on the basis of a detection result of the sensor 11 that detects the visual recognition state of both eyes of the user, the calculation unit 141 that calculates the display position in a depth direction of the virtual object, and the display control unit 145 that, in a case where it is determined that the display position in the depth direction is within the short distance threshold value $Th_1$ (corresponding to an example of the "first distance") indicating a predetermined short distance and both eyes of the user U are opened, reduces the visibility of the right-eye image and the left-eye image related to the virtual object, and in a case where it is determined that the display position in the depth direction is within the short distance threshold value $Th_1$ and only one eye of the user U is opened, increases the visibility reduced at least with respect to the display of the one eye. Hence, it is possible to display the virtual object within a short distance while reducing the burden on the user U.

Although the embodiments of the present disclosure have been described above, the technical scope of the present disclosure is not limited to the above-described embodiments as it is, and various changes can be made without departing from the gist of the present disclosure. Furthermore, components of different embodiments and modifications may be appropriately combined.

Furthermore, the effects of the embodiments described in the present specification are merely examples and are not limitative, and there may be other effects.

Note that the present technology can also have the following configurations.

(1)

An information processing apparatus causing a user of a head mounted display to perceive a depth position of a virtual object by controlling display positions of a right-eye image and a left-eye image related to the virtual object, the information processing apparatus comprising:

a determination unit that determines an opened/closed state of an eye of the user on a basis of a detection result of a sensor that detects a visual recognition state of both eyes of the user;

a calculation unit that calculates a display position in a depth direction of the virtual object; and a display control unit that, in a case where it is determined that the display position in the depth direction is within a first distance indicating a predetermined short distance and both eyes of the user are opened, reduces visibility of the right-eye image and the left-eye image related to the virtual object, and in a case where it is determined that the display position in the depth direction is within the first distance and only one eye of the user is opened, increases the visibility reduced at least with respect to display of the one eye.

(2)

The information processing apparatus according to (1), wherein the sensor detects a line of sight of the user or the visual recognition state by detecting an object that blocks a front of the eyes of the user.

(3) The information processing apparatus according to (2), wherein the determination unit, in a case where the line of sight is detected by the sensor, determines that an eye on a side where the line of sight is detected is opened, and, in a case where the line of sight is not detected by the sensor, determines that an eye on a side where the line of sight is not detected is closed.

(4)

The information processing apparatus according to (2) or (3), wherein the determination unit, in a case where the object is detected by the sensor, determines that an eye on a side where the object is detected is closed, and, in a case where the object is not detected by the sensor, determines that an eye on a side where the object is not detected is opened.

(5)

The information processing apparatus according to (1), wherein the display control unit reduces the visibility according to a positional relationship of the display position in the depth direction with respect to an area within the first distance.

(6)

The information processing apparatus according to (5), wherein the display control unit reduces the visibility by hiding in a case where the display position in the depth direction is within the first distance.

(7)
The information processing apparatus according to (6), wherein the display control unit gradually reduces the visibility when the display position in the depth direction continuously approaches an area within the first distance as the display position approaches the area within the first distance.

(8)
The information processing apparatus according to (6) or (7), wherein the display control unit gradually reduces the visibility in a case where the display position in the depth direction is calculated to be discontinuously within the first distance.

(9)
The information processing apparatus according to (3), wherein the display control unit also increases the visibility reduced with respect to display of another eye other than the one eye in a case where it is determined that the display position in the depth direction is within the first distance and only the one eye is opened.

(10)
The information processing apparatus according to (4), wherein the display control unit keeps the visibility reduced with respect to display of another eye other than the one eye reduced in a case where it is determined that the display position in the depth direction is within the first distance and only the one eye is opened.

(11)
The information processing apparatus according to (5), wherein the display control unit, when the display position in the depth direction is in an area between a second distance larger than the first distance and the first distance, increases the visibility more than when the display position is within the first distance, and reduces the visibility more than when the display position is outside the area within the second distance.

(12)
The information processing apparatus according to (11), wherein the display control unit gradually reduces the visibility when the display position in the depth direction is in the area between the second distance and the first distance as the display position approaches the area within the first distance.

(13)
The information processing apparatus according to (1), wherein the display control unit reduces the visibility by controlling a display mode of the virtual object.

(14)
The information processing apparatus according to (13), wherein the display control unit reduces the visibility by transparently displaying the virtual object.

(15)
The information processing apparatus according to (13) or (14), wherein the display control unit reduces the visibility by displaying the virtual object in a blurring manner.

(16)
The information processing apparatus according to any one of (13) to (15), wherein the display control unit reduces the visibility by changing a mode of contour display of the virtual object.

(17)
The information processing apparatus according to any one of (13) to (16), wherein the display control unit reduces the visibility by changing a mode of interval display of the virtual object.

(18)
The information processing apparatus according to any one of (1) to (17), wherein a virtual image distance of the head mounted display is optically fixed.

(19)
An information processing method using an information processing apparatus causing a user of a head mounted display to perceive a depth position of a virtual object by controlling display positions of a right-eye image and a left-eye image related to the virtual object, the information processing method comprising:
determining an opened/closed state of an eye of the user on a basis of a detection result of a sensor that detects a visual recognition state of both eyes of the user;
calculating a display position in a depth direction of the virtual object; and
in a case where it is determined that the display position in the depth direction is within a first distance indicating a predetermined short distance and both eyes of the user are opened, reducing visibility of the right-eye image and the left-eye image related to the virtual object, and in a case where it is determined that the display position in the depth direction is within the first distance and only one eye of the user is opened, increasing the visibility reduced at least with respect to display of the one eye.

(20)
A computer-readable recording medium recording a program for causing a computer that is an information processing apparatus causing a user of a head mounted display to perceive a depth position of a virtual object by controlling display positions of a right-eye image and a left-eye image related to the virtual object, to implement:
determining an opened/closed state of an eye of the user on the basis of a detection result of a sensor that detects a visual recognition state of both eyes of the user;
calculating a display position in a depth direction of the virtual object; and
in a case where it is determined that the display position in the depth direction is within a first distance indicating a predetermined short distance and both eyes of the user are opened, reducing visibility of the right-eye image and the left-eye image related to the virtual object, and in a case where it is determined that the display position in the depth direction is within the first distance and only one eye of the user is opened, increasing the visibility reduced at least with respect to display of the one eye.

REFERENCE SIGNS LIST

10 INFORMATION PROCESSING APPARATUS
11 SENSOR
12 DISPLAY UNIT
13 STORAGE UNIT
14 CONTROL UNIT
141 CALCULATION UNIT
142 STATE DETECTION UNIT
143 DETERMINATION UNIT
144 GENERATION UNIT
145 DISPLAY CONTROL UNIT

The invention claimed is:
1. An information processing apparatus causing a user of a head mounted display to perceive a depth position of a virtual object by controlling display positions of a right-eye image and a left-eye image related to the virtual object, the information processing apparatus comprising:

a determination unit that determines an opened/closed state of an eye of the user on a basis of a detection result of a sensor that detects a visual recognition state of both eyes of the user;
a calculation unit that calculates a display position in a depth direction of the virtual object; and
a display control unit that,
in a case where it is determined that the display position in the depth direction is within a first distance indicating a predetermined short distance and both eyes of the user are opened, reduces visibility of the right-eye image and the left-eye image related to the virtual object, and
in a case where it is determined that the display position in the depth direction is within the first distance and only one eye of the user is opened, increases the visibility reduced at least with respect to display of the one eye.

2. The information processing apparatus according to claim 1, wherein the sensor detects a line of sight of the user or the visual recognition state by detecting an object that blocks a front of the eyes of the user.

3. The information processing apparatus according to claim 2, wherein the determination unit, in a case where the line of sight is detected by the sensor, determines that an eye on a side where the line of sight is detected is opened, and, in a case where the line of sight is not detected by the sensor, determines that an eye on a side where the line of sight is not detected is closed.

4. The information processing apparatus according to claim 2, wherein the determination unit, in a case where the object is detected by the sensor, determines that an eye on a side where the object is detected is closed, and, in a case where the object is not detected by the sensor, determines that an eye on a side where the object is not detected is opened.

5. The information processing apparatus according to claim 1, wherein the display control unit reduces the visibility according to a positional relationship of the display position in the depth direction with respect to an area within the first distance.

6. The information processing apparatus according to claim 5, wherein the display control unit reduces the visibility by hiding in a case where the display position in the depth direction is within the first distance.

7. The information processing apparatus according to claim 6, wherein the display control unit gradually reduces the visibility when the display position in the depth direction continuously approaches the area within the first distance as the display position approaches the area within the first distance.

8. The information processing apparatus according to claim 6, wherein the display control unit gradually reduces the visibility in a case where the display position in the depth direction is calculated to be discontinuously within the first distance.

9. The information processing apparatus according to claim 3, wherein the display control unit also increases the visibility reduced with respect to display of another eye other than the one eye in a case where it is determined that the display position in the depth direction is within the first distance and only the one eye is opened.

10. The information processing apparatus according to claim 4, wherein the display control unit keeps the visibility reduced with respect to display of another eye other than the one eye reduced in a case where it is determined that the display position in the depth direction is within the first distance and only the one eye is opened.

11. The information processing apparatus according to claim 5, wherein the display control unit, when the display position in the depth direction is in an area between a second distance larger than the first distance and the first distance, increases the visibility more than when the display position is within the first distance, and reduces the visibility more than when the display position is outside the area within the second distance.

12. The information processing apparatus according to claim 11, wherein the display control unit gradually reduces the visibility when the display position in the depth direction is in the area between the second distance and the first distance as the display position approaches the area within the first distance.

13. The information processing apparatus according to claim 1, wherein the display control unit reduces the visibility by controlling a display mode of the virtual object.

14. The information processing apparatus according to claim 13, wherein the display control unit reduces the visibility by transparently displaying the virtual object.

15. The information processing apparatus according to claim 13, wherein the display control unit reduces the visibility by displaying the virtual object in a blurring manner.

16. The information processing apparatus according to claim 13, wherein the display control unit reduces the visibility by changing a mode of contour display of the virtual object.

17. The information processing apparatus according to claim 13, wherein the display control unit reduces the visibility by changing a mode of interval display of the virtual object.

18. The information processing apparatus according to claim 1, wherein a virtual image distance of the head mounted display is optically fixed.

19. An information processing method using an information processing apparatus causing a user of a head mounted display to perceive a depth position of a virtual object by controlling display positions of a right-eye image and a left-eye image related to the virtual object, the information processing method comprising:
determining an opened/closed state of an eye of the user on a basis of a detection result of a sensor that detects a visual recognition state of both eyes of the user;
calculating a display position in a depth direction of the virtual object; and
in a case where it is determined that the display position in the depth direction is within a first distance indicating a predetermined short distance and both eyes of the user are opened, reducing visibility of the right-eye image and the left-eye image related to the virtual object, and
in a case where it is determined that the display position in the depth direction is within the first distance and only one eye of the user is opened, increasing the visibility reduced at least with respect to display of the one eye.

20. A non-transitory computer-readable medium having stored thereon, computer-executable instructions which, when executed by a computer, cause the computer to execute operations which cause a user of a head mounted display to perceive a depth position of a virtual object by controlling display positions of a right-eye image and a left-eye image related to the virtual object, the operations comprising:

determining an opened/closed state of an eye of the user on a basis of a detection result of a sensor that detects a visual recognition state of both eyes of the user;

calculating a display position in a depth direction of the virtual object; and in a case where it is determined that the display position in the depth direction is within a first distance indicating a predetermined short distance and both eyes of the user are opened, reducing visibility of the right-eye image and the left-eye image related to the virtual object, and in a case where it is determined that the display position in the depth direction is within the first distance and only one eye of the user is opened, increasing the visibility reduced at least with respect to display of the one eye.

* * * * *